United States Patent
Aichinger et al.

(10) Patent No.: US 7,207,507 B2
(45) Date of Patent: Apr. 24, 2007

(54) PROCESS AND APPARATUS FOR THE GRANULATION OF SLUDGES

(75) Inventors: Christoph Aichinger, Rottenegg (AT); Alfred Aigner, Waldhausen (AT); Guenter Schrey, Linz (AT); Stefan Zettl, Munich (DE)

(73) Assignee: Voest-Alpine Industrieanlagenbau GmbH & Co. (DE)

( * ) Notice: Subject to any disclaimer, the term of this patent is extended or adjusted under 35 U.S.C. 154(b) by 0 days.

(21) Appl. No.: 11/543,175

(22) Filed: Oct. 4, 2006

(65) Prior Publication Data

US 2007/0023551 A1 Feb. 1, 2007

Related U.S. Application Data

(62) Division of application No. 10/239,452, filed as application No. PCT/EP01/02598 on Mar. 8, 2001.

(30) Foreign Application Priority Data

Mar. 20, 2000 (DE) ................................ 100 13 664

(51) Int. Cl.
*B02C 4/32* (2006.01)
*B02B 1/00* (2006.01)
(52) U.S. Cl. .......................................... 241/34; 241/38
(58) Field of Classification Search ................ 241/33, 241/34, 36, 38
See application file for complete search history.

(56) References Cited

U.S. PATENT DOCUMENTS 4,490,178 A 12/1984 Loggers et al.
4,848,675 A 7/1989 Loeblich et al.
4,915,741 A 4/1990 Biagini et al.
6,494,391 B2 * 12/2002 Mosenson et al. ............ 241/36

FOREIGN PATENT DOCUMENTS

| DE | 373181 | 4/1923 |
| DE | 253420 | 1/1988 |
| EP | 0031894 | 7/1981 |
| EP | 0805786 | 11/1997 |
| JP | 56-62534 | 5/1981 |
| SU | 647117 | 2/1979 |

* cited by examiner

*Primary Examiner*—Faye Francis
(74) *Attorney, Agent, or Firm*—Ostrolenk, Faber, Gerb & Soffen, LLP

(57) ABSTRACT

The invention relates to a process for the granulation of sludge- and optionally dust-form material, in which the material to be granulated is mixed with hydratable or hydraulically settable solids and water, which solids react exothermically with water and act as binder in the mixture, where the solids are allowed to hydrate or set fully or partly, and where the mixture containing the fully or partly hydrated or set solids is shaped into granules, where the solids and, if desired, dust-form materials to be granulated are wetted or moistened with water, and subsequently and/or at essentially the same time the solids are mixed with the material to be granulated. The invention also relates to an apparatus for carrying out the process.

4 Claims, 2 Drawing Sheets

PROCESS AND APPARATUS FOR THE GRANULATION OF SLUDGES

CROSS REFERENCE TO RELATED APPLICATIONS

This is a division of U.S. patent application Ser. No. 10/239,452, filed Sep. 11, 2003 in the name of Christoph Aichinger et al. and entitled METHOD AND DEVICE FOR GRANDULATING SLURRY AND/OR POWDERED MATERIAL, which is a 35 U.S.C. §§ 371 national phase conversion of PCT/EP01/02598, filed 8 Mar. 2001, which claims priority of German Application No. 100 13 664.8, filed Mar. 20, 2000. The PCT International Application was published in the German language

BACKGROUND OF THE INVENTION

The invention relates to a process for the granulation of sludge—and optionally dust-form material, in which the material to be granulated is mixed with hydratable or hydraulically settable solids and water, which solids react exothermically with water and act as binder in the mixture, where the solids are allowed to hydrate or set fully or partly, and where the mixture containing the fully or partly hydrated or set solids is shaped into granules. The invention furthermore relates to an apparatus for carrying out the process.

The granulation of sludges with hydraulically setting solids is widely known from the prior art.

Thus, for example, EP 0 031 894 A2 discloses mixing water-containing sludge with a hydratable or hydraulically settable solid and granulating the mixture. In this process, burnt lime and sludge are conveyed to a mixing and granulation device by means of two conveying screws which in each case initially convey burnt lime and sludge separately, the mixing and granulation device being formed by the two conveying screws, which now operate in one another.

In this way, a transfer point for burnt lime and sludge is created which is sufficiently far removed from the point of metering of the burnt lime and therefore avoids problems resulting from the exothermic reaction of burnt lime with the sludge water.

In EP 0 805 786 B1, sludges initially produced as dusts in the reduction of iron ore with a reduction gas and deposited in a scrubber in the form of sludges are mixed with burnt lime and, if desired, coal dust and subsequently granulated.

A common feature of the two processes mentioned is that the binder properties arising for the solids on mixing the moist sludges with the hydratable or hydraulically settable solids are dependent on the moisture content of the sludges. Since, however, the moisture content of sludges is generally not constant, this results in varying process conditions during admixing of the solids and consequently in a non-constant quality of the granules. Simultaneous granulation of dusts is—without additional addition of water—only possible to the extent to which the sludges contain an excess of water.

SUMMARY OF THE INVENTION

It is the object of the present invention to provide a process in which the problems during mixing of solids and material to be granulated are reduced and which also allows sludge-form and dust-form material in any desired mixing ratios to be converted into granules of constant high quality in each case.

This object is achieved in accordance with the invention in that the solids and, if desired, dust-form materials to be granulated are wetted or moistened with water, and subsequently and optionally at essentially the same time the solids are mixed with the material to be granulated and that sufficient water is added to the solids so that a temperature which supports or effects further drying-off of unreacted water arises during the subsequent mixing and/or granulation operation.

The measure of moistening the solids with water before or at essentially the same time as they are mixed with the material to be granulated has two effects: some of the water reacts with the solids even before they are mixed with the material. This has the consequence that some of the material to be granulated is already mixed with binder and not, for example, with a substance from which the entire binder would have to form first.

Secondly, some of the water is retained, which makes it possible to mix moist sludges or moistened dusts with moist solid. The known difficulties which occur on mixing moist substances with dry substances, such as, for example, clumping, are greatly reduced or are eliminated completely.

The term dust-form material here is taken to mean dusts, for example carbon dusts or oxidic dusts, such as ore dusts, filter dusts, etc., which cannot act as binder. The process according to the invention thus covers both application cases in which exclusively sludges and principally or exclusively dusts are to be granulated, if desired with admixing of sludge fractions.

It is advantageous to add sufficient water to the solids so that a temperature which supports or effects further drying-off of unreacted water arises during the subsequent mixing and/or granulation operation.

Since water reacts exothermically with the solids, the mixing and granulation temperature arising can be controlled by regulating the addition of water.

The addition of water is advantageously regulated here in such a way that sufficient water is added to the solids that a mixing temperature of from 80 to 97° C., preferably from 88 to 95° C., then results.

The process according to the invention enables a high temperature level to be set specifically and kept constant. A constantly high temperature level allows firstly a uniformly high chemical reaction rate and also high evaporation performance. Overall, the process according to the invention therefore enables accelerated production of granules of constantly high quality.

However, the mixing temperature can of course be controlled not only by a variation of the addition of water, but in addition also by regulation of the amount of hydratable or hydraulically settable solids.

According to an advantageous embodiment of the process according to the invention, an amount of water which is at least equally as large as the amount of water necessary for complete hydration or setting of the solids is added to the solids.

It has been found that the process according to the invention achieves the best results regarding the quality of the granules, in particular the mixture homogeneity and mechanical stability, if an amount of water is added which is at least equally large, but preferably in excess of the amount theoretically necessary, on the basis of the stoichiometry, for complete reaction of the solids.

Since the reaction of the solids with water is not yet complete at the time when they are brought into contact with the material to be granulated, consistency of the solid/water mixture is then optimum for good miscibility with the material to be granulated.

The use of burnt lime, in particular hard burnt lime, as hydratable or hydraulically settable solid has proven particularly advantageous for the process according to the invention.

However, similar substances, such as, for example, burnt dolomite, can also be employed for the process according to the invention.

According to an embodiment of the process according to the invention, dust-form material is moistened with water at essentially the same time as and together with the solids.

In particular in the case of granulation of dusts, it is obvious to moisten the solids and dust-form material at the same time with the same stream of water.

According to a further embodiment, sludge-form material is mixed with the solids, after the solids have been wetted with water.

According to a further advantageous feature, sludges having a moisture content of from 20 to 50%, preferably from 30 to 40%, are mixed with the solids.

Sludges having this moisture content are highly suitable for the process according to the invention with respect to their consistency and their handle-ability. The moisture content is also sufficiently small so that there is also no increased demand for hydratable or hydraulically settable solids compared with the prior art.

A further embodiment which likewise applies in the processing of dusts consists in wetting dust-form material with water separately from the solids and only thereafter mixing it with the wetted solids.

In the case of direct mixing of dry dusts into moist sludges, however, narrow limits with respect to the amounts of dust that can be admixed have hitherto arisen owing to the prespecified moisture content of the sludges. Here too, the problem of mixing dry substances with moist substances additionally occurs.

In accordance with the invention, it is possible with each of the embodiments in which dusts are processed to process significantly greater dust rates than has hitherto been the case for a prespecified amount of sludge water. Furthermore, the advantage again applies that a material which is already moist can be mixed into the sludge or the moistened solids, which results—as in the process procedure without the dusts—in a shortened residence time compared with the prior art and thus optimized utilization of the reactor volume, and a significant improvement in the granule quality.

Through the introduction of water into the dust, the latter is initially moistened and free surfaces of the dust particles, in some cases also within capillaries, are wetted. Through the wetting, it is avoided that after the addition of the solids, the important solids/water ratio, including to the dusts, is outside the suitable range at some points.

A further advantage which applies in the processing of all dusts, but in particular in the case of dusts which are difficult to wet, and on use of burnt lime is that, through formation of calcium hydroxide in the reaction of calcium oxide with water, a high pH arises, which in turn favours the wettability of dust-form substances.

For carrying out and influencing the process to the optimum, the mixing and granulation temperature is advantageously measured continuously and/or discontinuously, and the addition of water and/or the addition of solids and/or the mixing and granulation speed are controlled as a function of the measured temperature.

The addition of water and solids influences the resultant mixing and granulation temperature and thus also the reaction rate, while regulation of the mixing and granulation speed (by regulation of the speed of the mixing reactor/granulator) enables adaptation of the residence time in the mixing reactor.

The invention also relates to an apparatus for carrying out the process according to the invention, having a mixing reactor comprising a mixing vessel and a drivable mixing device, a feed device for hydratable or hydraulically settable solids, at least one feed device for material to be granulated, a feed device for water and a granulation device.

The aim of the apparatus according to the invention is to reduce problems in the mixing of solids and material to be granulated, and to make it possible to convert sludge-form and dust-form material in any desired mixing ratios into granules of constantly high quality in each case.

This object is achieved in that the water feed device merges into the feed device for the solids in such a way that fed solids are wettable by fed water. The water feed device here is designed in such a way that the solids are wetted even before they come into contact with other material already present in the mixing vessel and that one or more temperature sensors are arranged in the mixing vessel, which temperature sensors are connected to a measuring and control device, the measuring and control device being connected to the water feed and/or the solids feed and/or the drive of the mixing device.

The mixing vessel here is advantageously designed as a mixing drum, and the mixing device is advantageously designed as a mixer shaft with mixing tools attached thereto.

The granulation device downstream of the mixing vessel is preferably spatially separate from the mixing vessel, for example in the manner of EP 0 805 786 B1. However, the invention also covers a one-stage mixer/-granulator, in which the mixing vessel or the mixing device with mixing and granulation tools attached thereto, effects production of the granules.

A steam vapour extractor is advantageously arranged on the mixing vessel and extracts the moisture drying off during the mixing and granulation from the mixing vessel.

Advantageously, one or more temperature sensors are arranged in the mixing vessel, which temperature sensors are connected to a measuring and control device, the measuring and control device being connected to the water feed and/or the solids feed and/or the drive of the mixing device.

This enables an optimum influence to be brought to bear on the process parameters, in particular on the temperature arising, the residence time in the reactor, the residual moisture of the granules and thus the quality of the granules.

A target value for the mixing and granulation temperature can be fed from an external source to the measurement and control device in a known manner.

In order to enable dusts which are not hydratable or hydraulically settable to be granulated, such dusts, in particular oxidic dusts and/or carbon dusts, can be fed to the mixing vessel.

In a preferred manner, dust-form material can be fed to the mixing vessel via the solids feed device, in which case solids and dusts can be wetted jointly by water, which can be fed in by means of the water feed device. Dust-form material is in turn wetted before it comes into contact with material already mixing in the mixing vessel and mixed therewith.

According to a further feature, a separate feed device is provided on the mixing vessel by means of which dust-form material can be fed to the mixing vessel, into which dust feed device a further water feed device merges in such a way that dusts fed in via the separate dust feed device can be wetted by water fed in by means of the further water feed device.

The further water feed device is also arranged in such a way that dust-form material is wetted even before it comes into contact with other material already present in the mixing vessel and mixed therewith.

BRIEF DESCRIPTION OF THE DRAWINGS

The process according to the invention and the apparatus according to the invention are explained below with reference to embodiments shown diagrammatically in the drawings FIGS. 1 and 2.

DESCRIPTION OF THE PREFERRED EMBODIMENTS

Figure 1:
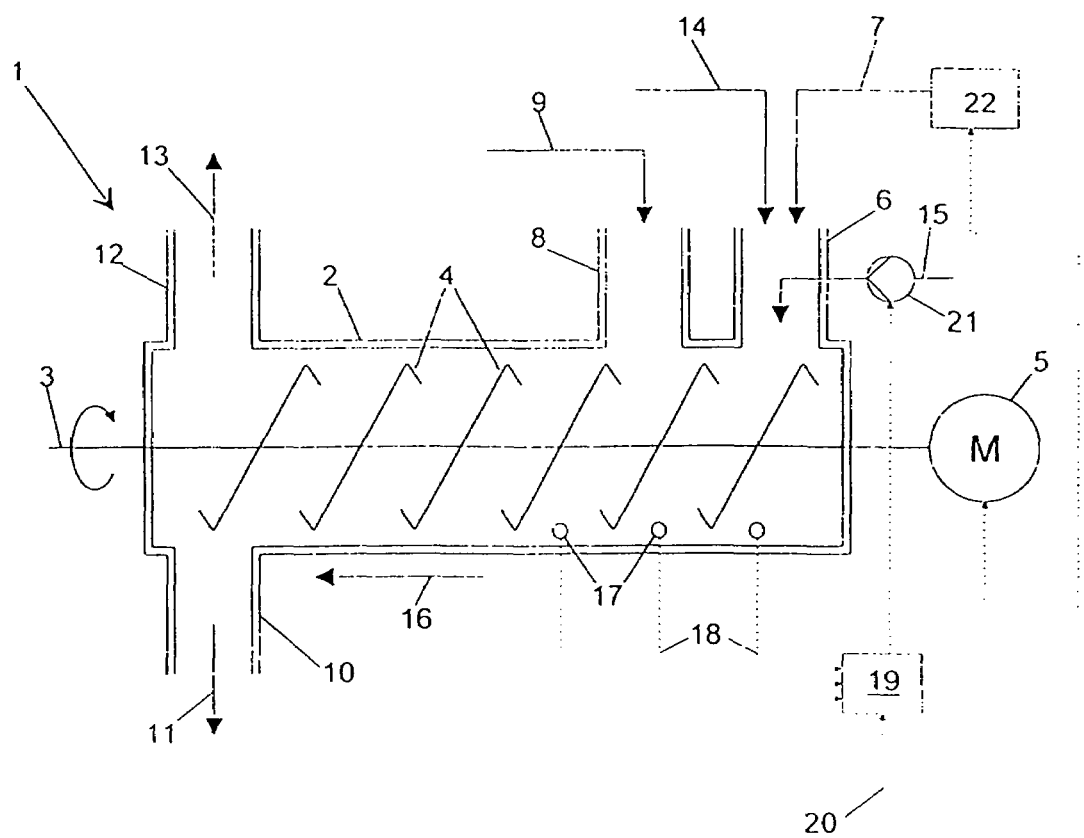

The mixing reactor 1 shown in the drawing FIG. 1 consists of a mixing vessel 2, which is designed here as a mixing drum, and a mixer shaft 3, to which mixing and granulation tools 4 are attached. The mixer shaft 3 is driven from outside the mixing vessel 2, for example by means of an electric motor 5.

The mixing vessel 2 is provided with a feed device 6 for solids 7, for example burnt lime, and with a feed device 8 for sludge 9. The mixing vessel 2 is furthermore provided with a discharge device 10 for granules 11 and with an extractor device 12 for steam vapours 13. Dusts 14 can additionally be introduced into the feed device 6 for solids 7, and a water feed 15 merges into the solids feed device 6.

The feed devices 6, 8 for solids 7 and sludges 9 are preferably designed as filling ports. Solids 7 and sludges 9 are firstly introduced into the feed devices by means of their own charging devices (not shown in the drawing). The water feed device 15 here is preferably designed as one or more nozzles, from which nozzles a 'water cone' emanates. The charging devices for solids and dusts convey directly onto this water cone. Immediate and direct wetting of solids and dusts is the consequence.

During operation of the mixing reactor 1, burnt lime and oxidic dusts are charged into the mixing vessel 2 via the feed device 6 and at the same time water is sprayed into the mixing vessel 2 via the water feed 15 and the dusts and the burnt lime are moistened thereby. The driven mixer shaft 3 generates with the mixing and granulation tools 4 a material flow 16 in the direction of the granule discharge device 10. Water, burnt lime and dusts are mixed with one another, and water and burnt lime begin to react with one another to form $Ca(OH)_2$, the actual binder. Via the feed device 8, moist sludges are charged into the mixing vessel 2 and mixed with the mixture of moistened dusts and moistened and partially reacted burnt lime. During further mixing and granulation, the remainder of the burnt lime is reacted, and the mixture is shaped in the second part of the mixing zone into granules 11, which are discharged from the mixing vessel 2 via the granule discharge device 10. Owing to the heat liberated during the reaction of burnt lime with water, some of the remaining water evaporates and is extracted as steam 13 via the steam extractor device 12.

For measuring the mixing and granulation temperature, temperature sensors 17, which are connected to a measurement and control device 19 via signal lines 18, are arranged in the mixing vessel 2 at suitable points. The measurement and control device 19 is fed from the outside with a temperature target value 20 and, if desired, with target and actual values of further process and granule parameters (not shown in the drawing), such as, for example, granule residual moisture content, residence time, water and burnt lime feed rate, etc. After target/actual comparisons carried out by the measurement and control device 19, where appropriate taking into account prespecified tolerance thresholds, the measurement and control device 19 can have a control action on the respective plant part, for example on the motor 5 driving the mixer shaft 3, a pump 21 arranged in the water feed 15 or a measuring device 22 controlling the addition of burnt lime.

Figure 2:
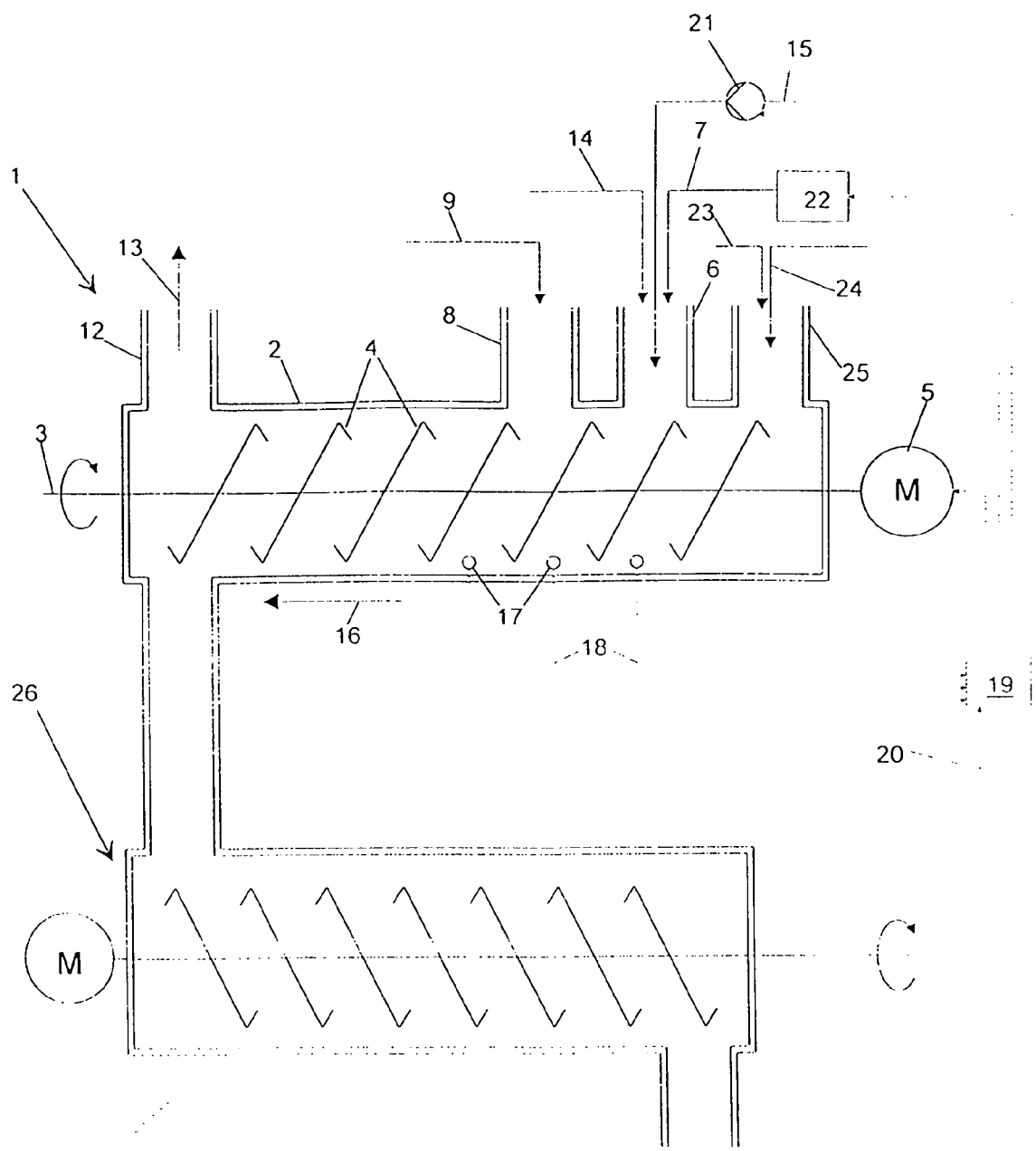

The embodiment shown in FIG. 2 differs from the embodiment shown in FIG. 1 in that a separate feed device 25 for dusts 23 is additionally provided. A further water feed device 24, which is preferably identical in construction and function with the water feed device 15, merges into the separate dust feed device 25.

Downstream of the mixing reactor 1 is in addition arranged a granulator 26, which is separate therefrom in construction terms and in which the production of the granules is carried out.

WORKING EXAMPLE 1800 kg/h of oxidic dusts and 2200 kg/h of burnt lime are introduced jointly into a mixing reactor via a chute. During the introduction, dusts and burnt lime are wetted with 1400 l/h of water. The mixture of oxidic dusts and burnt lime wetted with water is immediately thereafter mixed with 8600 kg/h of partially dewatered sludge. The sludge has a residual moisture content of about 31% and originates from wet washer devices in an ore reduction plant.

Due to the exothermic reaction of the water with the burnt lime, a constant temperature of about 91–92° C. arises in the mixing reactor. After extraction of steam vapours, granulated material having a residual moisture content of about 18% is discharged.

The invention claimed is:

1. An apparatus for granulation of sludge and/or dust-form material, comprising:
   a mixing reactor containing a mixing vessel, a drivable mixing device in the vessel, a drive connected to the mixing device,
   a solids feed device for feeding hydratable or hydraulically settable solids to the vessel,
   at least one second feed device for feeding material to be granulated to the vessel,
   a water feed device for feeding water to the vessel, and
   a granulation device, wherein the water feed device runs into the feed device for the solids in such a way that fed solids can be wetted by fed water,
   one or more temperature sensors, and a measurement and control device to which the temperature sensors are connected and being arranged in the mixing vessel, the measurement and control device is connected to at least one of the water feed, a metering device for the solids and the drive of the mixing device.

2. An apparatus as claimed in claim 1, further comprising a steam extractor is arranged on the mixing vessel.

3. An apparatus as claimed in claim 1, wherein the solids feed device is operable to feed dust-form material to the mixing vessel such that solids and dusts can be wetted jointly by water, which can be fed in by means of the water feed device.

4. An apparatus as claimed in claim 1, further comprising a separate feed device operable to feed dust-form material to the mixing vessel and being provided on the mixing vessel a further water feed device running into the separate feed device in such a way that dust fed in via the separate dust feed device can be wetted by means of water fed in by the further water feed device.

* * * * *